(12) United States Patent
Prüssmeier et al.

(10) Patent No.: US 9,188,421 B2
(45) Date of Patent: Nov. 17, 2015

(54) METHOD AND POSITION DETECTION APPARATUS FOR DETECTING A POSITION OF A MOVABLE ELEMENT OF A DRIVE APPARATUS

(71) Applicant: Beckhoff Automation GmbH, Verl (DE)

(72) Inventors: Uwe Prüssmeier, Lemgo (DE); Jan Achterberg, Duisburg (DE); Tim Kaulmann, Paderborn (DE); Manuel Bettenworth, Rietberg (DE); Jan-Hendrik Bade, Verl (DE)

(73) Assignee: BECKHOFF AUTOMATION GMBH, Verl (DE)

( * ) Notice: Subject to any disclaimer, the term of this patent is extended or adjusted under 35 U.S.C. 154(b) by 155 days.

(21) Appl. No.: 13/967,577

(22) Filed: Aug. 15, 2013

(65) Prior Publication Data

US 2013/0328516 A1  Dec. 12, 2013

Related U.S. Application Data

(63) Continuation of application No. PCT/EP2011/074079, filed on Dec. 27, 2011.

(30) Foreign Application Priority Data

Feb. 17, 2011 (DE) .......................... 10 2011 004 348

(51) Int. Cl.
*G05B 1/06* (2006.01)
*G01B 7/14* (2006.01)
(Continued)

(52) U.S. Cl.
CPC ................ *G01B 7/14* (2013.01); *G01D 5/2046* (2013.01); *H02P 31/00* (2013.01)

(58) Field of Classification Search
CPC .......... G05F 1/625; H02J 17/00; H02P 31/00; H02K 24/00; G01B 7/14
USPC ........................................................ 318/656
See application file for complete search history.

(56) References Cited

U.S. PATENT DOCUMENTS 5,998,992 A 12/1999 Arai
6,011,389 A 1/2000 Masreliez et al.
(Continued)

FOREIGN PATENT DOCUMENTS

CN 101501454 A 8/2009
DE 43 11 973 2/1997
(Continued)

OTHER PUBLICATIONS

International Search Report issued in connection with International Patent Application No. PCT/EP/2011 dated Apr. 5, 2012. 3 pages.
(Continued)

*Primary Examiner* — Karen Masih
(74) *Attorney, Agent, or Firm* — Dorsey & Whitney LLP; Nathaniel P. Longley

(57) ABSTRACT

A method for detecting a position of a movable element of a drive apparatus by means of a position detection apparatus comprising at least one field coil and at least one secondary coil associated with the field coil, wherein an electrical excitation pulse is applied to the field coil in order to induce an electrical voltage in the secondary coil, a secondary coil voltage is measured and the position of the movable element is determined on the basis of the measured secondary coil voltage. The invention also relates to a position detection apparatus and/or a drive apparatus.

20 Claims, 11 Drawing Sheets

(51) Int. Cl.
*G01D 5/20* (2006.01)
*H02P 31/00* (2006.01)

(56) References Cited

U.S. PATENT DOCUMENTS

| 6,781,524 | B1 | 8/2004 | Clark et al. | |
|---|---|---|---|---|
| 2008/0164869 | A1 | 7/2008 | Bach et al. | |
| 2009/0243596 | A1 | 10/2009 | Izak et al. | |
| 2010/0181989 | A1 | 7/2010 | Reime | |
| 2012/0217111 | A1* | 8/2012 | Boys et al. | 191/10 |

FOREIGN PATENT DOCUMENTS

| DE | 197 38 836 A1 | 3/1999 |
|---|---|---|
| DE | 698 05 871 T2 | 2/2003 |
| DE | 10 2005 045 374 A1 | 4/2007 |
| DE | 10 2007 016 787 A1 | 10/2008 |
| DE | 10 2007 027 419 A1 | 12/2008 |
| EP | 0856722 A1 | 8/1998 |
| EP | 1 229 301 A1 | 8/2002 |
| EP | 2 105 713 A1 | 9/2009 |

OTHER PUBLICATIONS

Letter from Wilhelm & Beck, European Patent Attorneys, Munichto the European Patent Office, Munich, dated May 15, 2012. 43 pages.
German Search Report dated Feb. 20, 2012 for application No. 102011004348.9. 10 pages.
English translation of Chinese Foreign Office Action for Application No. 201180069725.0, received on May 28, 2015 (7 pages).

* cited by examiner

METHOD AND POSITION DETECTION APPARATUS FOR DETECTING A POSITION OF A MOVABLE ELEMENT OF A DRIVE APPARATUS

CROSS-REFERENCE TO RELATED APPLICATIONS

This application is a continuation of International Patent Application No. PCT/EP2011/074079, filed Dec. 27, 2011 which claims the benefit of German Patent Application No. 10 2011 004 348, filed on Feb. 17, 2011, the contents of all of which are hereby incorporated herein by reference in their entirety.

BACKGROUND

The patent specification U.S. Pat. No. 6,781,524 discloses a position detection system for vehicles moving on a roadway. The known system comprises a magnetic element arranged on each of the vehicles. Sensor coils are arranged in the roadway. If a vehicle with its magnetic element then travels over such a sensor coil, a magnetic flux is generated in said sensor coil by means of the magnetic element. The magnetic flux can then be measured by means of the measurement of a sensor coil voltage, such that a presence of the vehicle above the sensor coil can be detected.

What is disadvantageous about this, for example, is that a considerable time elapses before it is possible to determine a vehicle position on the basis of the measured sensor coil voltage. That is owing to the fact, in particular, that a continuous periodic voltage signal is applied to the sensor coil, and so only a continuous measurement signal is available for the purpose of position determination, here the envelope of the measurement signal being measured over a plurality of periods, which takes a considerable amount of time.

SUMMARY

A problem addressed by the present invention can therefore be considered that of providing a method for detecting a position of a movable element of a drive apparatus which overcomes disadvantages of known methods and enables faster position detection. Other problems addressed by the present invention can furthermore be considered that of providing a corresponding apparatus for detecting a position of a movable element of a drive apparatus, and/or providing a corresponding drive apparatus comprising a movable element in which fast detection of the position of the movable element is made possible.

In one embodiment, the invention comprises a method for detecting a position of a movable element of a drive apparatus is provided. The apparatus for detecting the position, which can also be designated as a position detection apparatus, comprises at least one excitation coil and at least one secondary coil assigned to the excitation coil.

An electrical excitation pulse is applied to the excitation coil. Said excitation pulse then induces an electrical voltage in the secondary coil. The secondary coil voltage is measured, that is to say the electrical voltage present at the secondary coil. The position of the movable element is subsequently determined on the basis of the measured secondary coil voltage.

According to a further aspect of the present invention, an apparatus for detecting a position of a movable element of a drive apparatus is provided, which has at least one excitation coil and at least one secondary coil assigned to the excitation coil. Furthermore, a pulse generator is provided, which is formed so as to apply an electrical excitation pulse to the excitation coil, with the result that an electrical voltage is thereby induced in the secondary coil. Furthermore, a detector is formed, which can measure the electrical voltage in the secondary coil, that is to say the secondary coil voltage. An apparatus for detecting a position of a movable element of a drive apparatus within the meaning of the present invention can generally also be designated as a position detection apparatus.

In accordance with another aspect of the invention, a drive apparatus is provided, which comprises a movable element and a position detection apparatus for detecting a position of the movable element according to the present invention. Preferably, i.e. in some preferred embodiments, the position detection apparatus is formed in a manner integrated in the drive apparatus. In some preferred embodiments, the position detection apparatus can be formed separately from the drive apparatus, with the result that retrofitting, for example subsequent integration, on an existing drive apparatus is advantageously possible.

DETAILED DESCRIPTION

In the following, reference is made to embodiments of the present invention, including preferred embodiments. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" and/or to "the present invention" shall not be construed as a generalization of any inventive subject matter disclosed herein and shall not be considered to be an element or limitation of the appended claims except where explicitly recited in a claim(s).

Hereinafter, identical reference signs are used for identical features.

Figure 1:
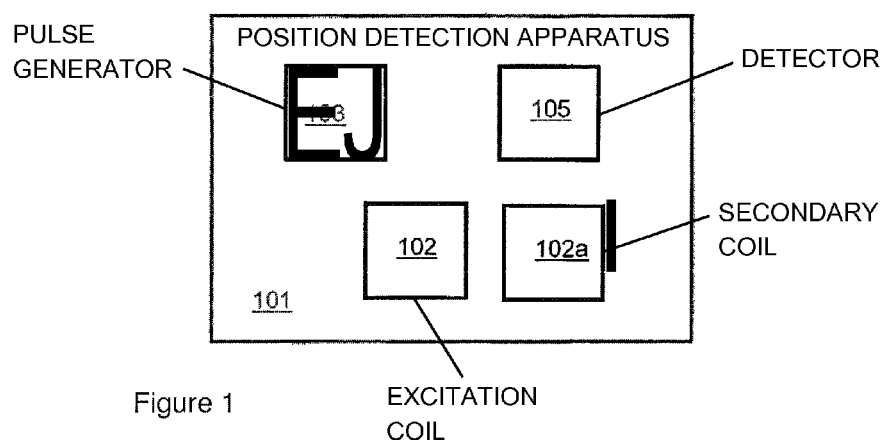
FIG. 1 shows an apparatus for detecting a position of a movable element of a drive apparatus.

FIG. 1 shows an apparatus 101 for detecting a position of a movable element (not shown) of a drive apparatus (not shown). The position detection apparatus 101 has at least one excitation coil 102 and at least one secondary coil 102a assigned to the excitation coil. Preferably, a plurality of excitation coils and/or a plurality of secondary coils can also be provided. The apparatus 101 furthermore comprises a pulse generator 103, which can apply an electrical excitation pulse to the excitation coil 102. On account of the electrical excitation pulse being applied to the excitation coil 102, an electrical coil voltage is induced in the secondary coil 102a. Furthermore, a detector 105 is provided, which can measure the secondary coil voltage. The position of the movable element can be determined on the basis of the measured coil voltage. By way of example, an evaluation apparatus can be provided for the determination.

Figure 2:
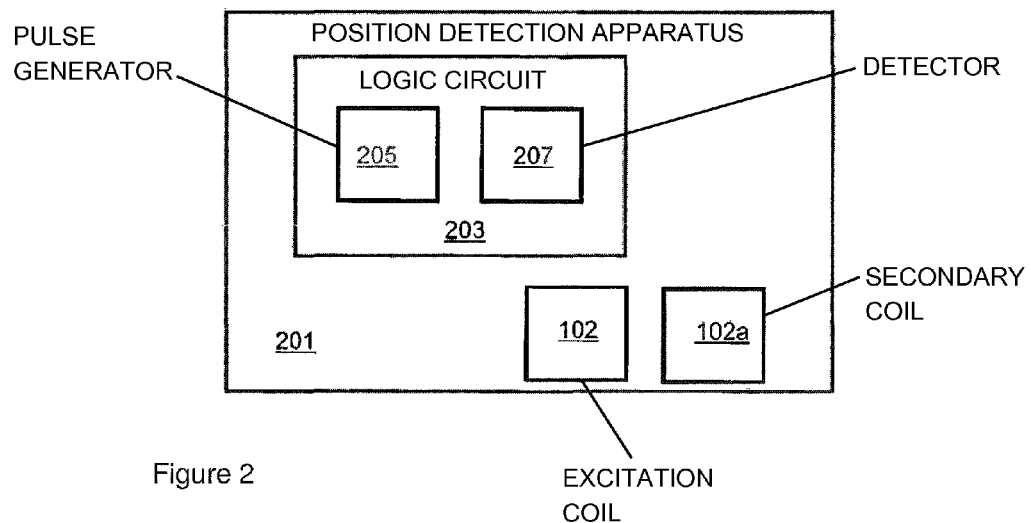
FIG. 2 shows a further apparatus for detecting a position of a movable element of a drive apparatus.

FIG. 2 shows a further apparatus 201 for detecting a position of a movable element (not shown) of a drive apparatus (not shown). The apparatus 201 has a logic circuit 203, which is preferably formed as an FPGA or as an ASIC. The logic circuit 203 has a pulse generator 205, which can apply an electrical excitation pulse to the excitation coil 102 for inducing an electrical coil voltage in the secondary coil 102a. Furthermore, the logic circuit 203 has a detector 207 for measuring the secondary coil voltage. The pulse generator 205 and the detector 207 can preferably be formed as an electronic circuit in the logic circuit 203. However, it is also possible, in particular, that the pulse generator 205 and/or the detector 207 can be realized in the logic circuit 203 using software.

Figure 3:
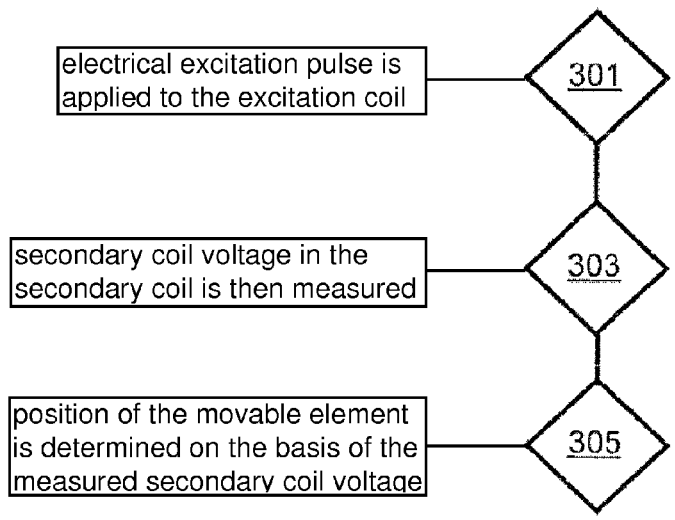
FIG. 3 shows a flow chart of a method for detecting a position of a movable element of a drive apparatus.

FIG. 3 shows a flow chart of a method for detecting a position of a movable element of a drive apparatus by means of a position detection apparatus comprising an excitation coil and a secondary coil assigned to the excitation coil. In a step 301, an electrical excitation pulse is applied to the excitation coil, such that an electrical voltage or coil voltage is induced in the secondary coil. In a subsequent step 303, the secondary coil voltage in the secondary coil is then measured. In a step 305, the position of the movable element is determined on the basis of the measured secondary coil voltage.

Figure 4:
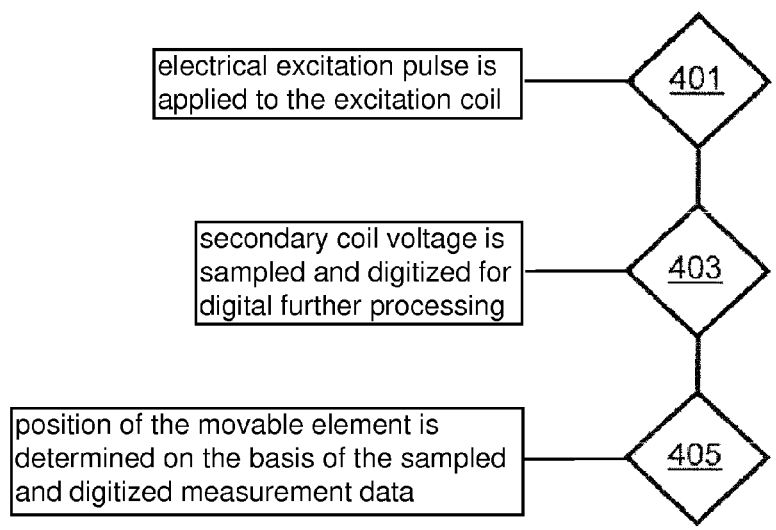
FIG. 4 shows a further flow chart of a method for detecting a position of a movable element of a drive apparatus.

FIG. 4 shows a flow chart of another method for detecting a position of a movable element of a drive apparatus. In a step 401, an electrical excitation pulse is applied to the excitation coil. As a consequence, an electrical voltage is thereby induced in the secondary coil. In a step 403, the secondary coil voltage is sampled and digitized for digital further processing. In a subsequent step 405, the position of the movable element is determined on the basis of the sampled and digitized measurement data.

Figure 5:
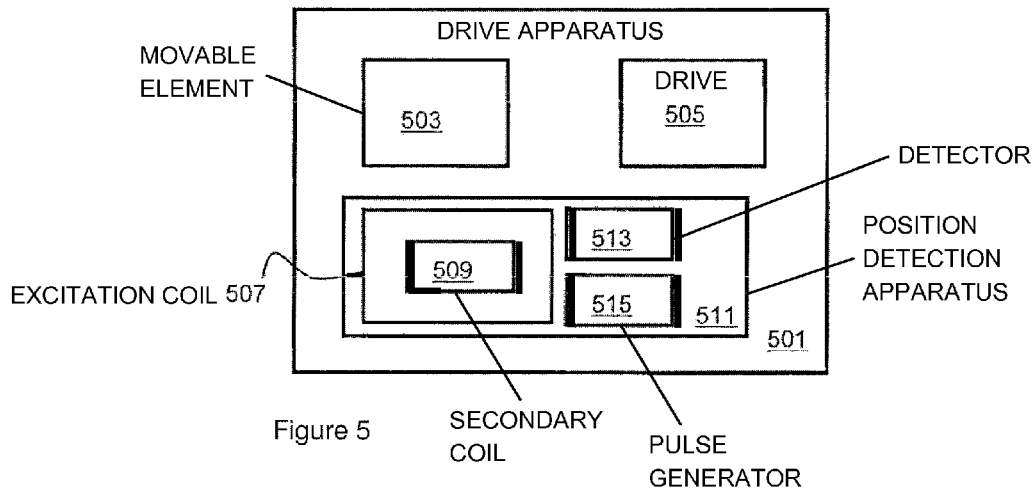
FIG. 5 shows a drive apparatus.

FIG. 5 shows a drive apparatus 501 comprising a movable element 503. The movable element 503 is displaced by means of a drive 505. Furthermore, an excitation coil 507 and a secondary coil 509 assigned to the excitation coil 507 are formed, which are comprised by an apparatus 511 which can detect a position of the movable element 503 of the drive apparatus 505. The position detection apparatus 511 furthermore comprises a detector 513 and a pulse generator 515. The apparatus 511 can be, for example, the position detection apparatus 101 from FIG. 1 or the position detection apparatus 201 from FIG. 2. The apparatus 511 can be formed in a manner integrated into the drive apparatus 501, as shown here. Alternatively, provision can be made, in particular, for the position detection apparatus 511 to be operated independently of the drive apparatus 501, such that it can be retrofitted to existing drive apparatuses, for example. Preferably, the position detection apparatus 511 can be formed as an independent module which is formed separately from the drive apparatus 501 and which can subsequently be integrated into the drive apparatus 501.

Figure 6:
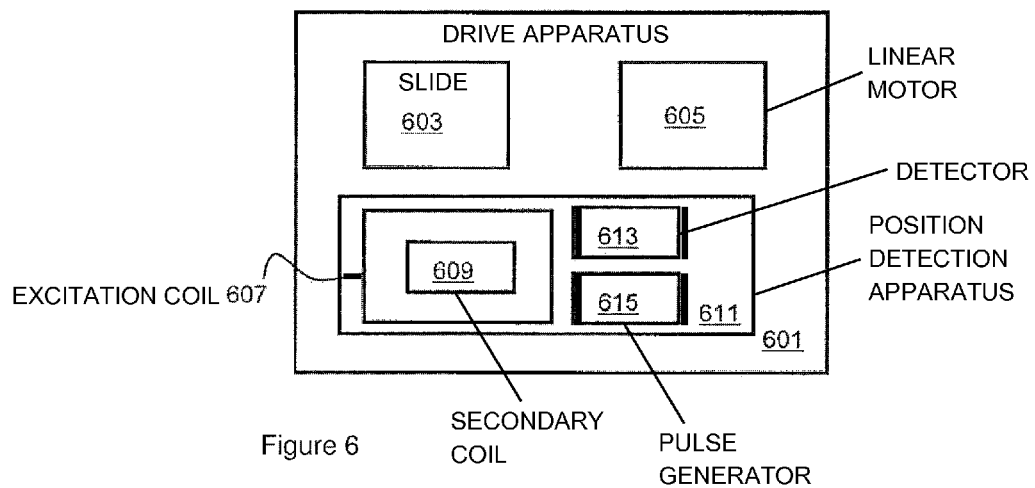
FIG. 6 shows a further drive apparatus.

FIG. 6 shows another drive apparatus 601. The drive apparatus 601 comprises a movable element which is embodied as a slide 603 and which can be displaced, in particular linearly displaced, by means of a linear motor 605. Furthermore, a position detection apparatus 611 is provided, which can detect a position of the slide 603. The position detection apparatus 611 can be, for example, the apparatus 101 from FIG. 1 or the apparatus 201 from FIG. 2. The position detection apparatus 611 comprises an excitation coil 607, to which a secondary coil 609 is assigned. An excitation coil within the meaning of the present invention can generally also be designated as a primary coil. The position detection apparatus 611 furthermore comprises a detector 613 and a pulse generator 615. In an embodiment that is not shown, a plurality of slides can also be provided. In particular, a plurality of excitation coils and/or a plurality of secondary coils can also be formed. The position detection apparatus 611 applies an electrical excitation pulse to the excitation coil 607. An electrical voltage is thereby induced in the secondary coil 609. If, by way of example, the slide 603 is then situated above the secondary coil 609, the electromagnetic field of the secondary coil 609 is interfered with or influenced. This interference or this influencing is then manifested in a corresponding induced coil voltage, such that, by means of a measurement of the coil voltage, it is possible to detect whether the slide 603 is situated above the secondary coil 609. If no slide 603 is situated above the secondary coil 609, no interference or influencing of the electromagnetic field is ascertained or measured.

A linear motor within the meaning of the present invention corresponds, in particular, to a linear embodiment of a rotary machine having a primary part, through which current flows and which is comparable to a stator of a rotary motor, and a reaction part, i.e. a secondary part, which corresponds to a rotor of the rotary motor. In the case of linear motors, a distinction can be made, in particular, between asynchronous and synchronous motors, wherein the secondary part is equipped with short-circuiting bars in the case of the asynchronous design, whereas it consists of permanent magnets in the case of the synchronous motor. Synchronous motors have the advantage, in particular, that they have a high efficiency and high continuous advancing forces. Linear motors within the meaning of the present invention can be used, in particular, for generating translational advancing movements.

Figure 7:
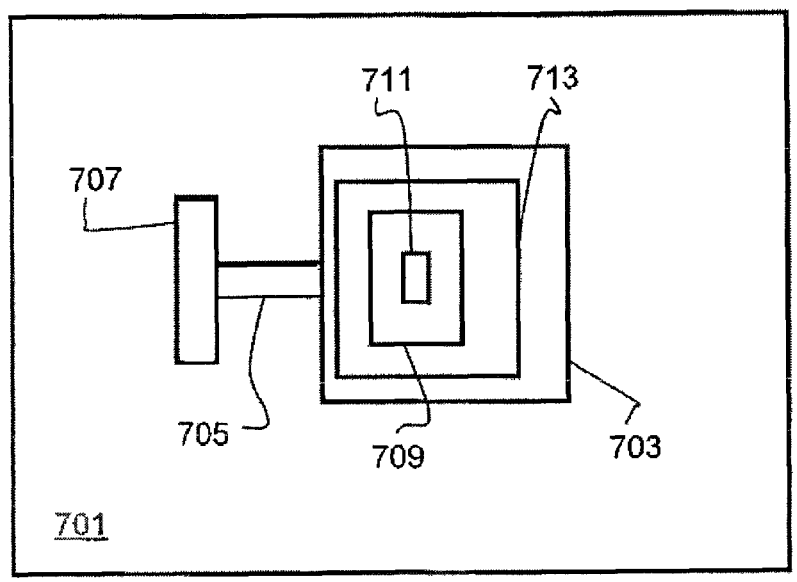
FIG. 7 shows another drive apparatus.

FIG. 7 shows a further drive apparatus 701 comprising a rotary motor 703. The rotary motor 703 can be formed as an electric motor, for example. The rotary motor 703 has a driveshaft 705. A movable element 707 is arranged on the driveshaft 705. By way of example, the movable element 707 can be a disk. In particular, a center of symmetry or the centroid of the movable element 707 is placed on the driveshaft 705.

This advantageously makes it possible for the movable element 707 to be mounted in a rotatable manner by means of the rotary motor 703. The movable element 707 preferably comprises an electrically conductive material. In particular, the movable element 707 can also be formed completely from an electrically conductive material.

The rotary motor 703 furthermore comprises an excitation coil 709 and a secondary coil 711 assigned to the excitation coil 709, wherein both coils 709 and 711 are comprised by a position detection apparatus 713. In an exemplary embodiment that is not shown, a plurality of excitation coils and/or a plurality of secondary coils can also be provided. The excitation coil 709 and the secondary coil 711 are preferably formed as conductor tracks on a circuit board, wherein the circuit board is arranged in a stationary manner on or in the rotary motor 703. Generally, the excitation coil 709 and the secondary coil 711 are secured or arranged in a stationary or fixed manner on or in the rotary motor 703. That is to say, in particular, that the coils do not move concomitantly during a rotation of the movable element 707 by means of the rotary motor 703.

The position detection apparatus 713 is formed in a manner integrated in the drive apparatus 701, but can in particular also be formed as an independent module which can subsequently be integrated into a drive apparatus that has already been produced. In particular, the position detection apparatus 713 can detect an angle of rotation of the movable element 707. The apparatus 713 can be, for example, the position detection apparatus 101 from FIG. 1 or the position detection apparatus 201 from FIG. 2. The position detection apparatus 713 applies an electrical excitation pulse or a plurality of electrical excitation pulses to the excitation coil 709, such that an electrical voltage is induced in the secondary coil 711. On account of the rotation of the movable element 707, which preferably has one or a plurality of cutouts, for example in the form of stamped-out portions, the electromagnetic field in the secondary coil 711 is interfered with. This interference can be detected by means of measurement of the coil voltage of the secondary coil 711 and the angle of rotation of the movable element 707 can be determined on the basis thereof. Since the movable element 707 is fixedly seated on the driveshaft 705 or connected thereto, an angle of rotation of the driveshaft 705 can thus also be determined. In this respect, the position apparatus 713 can also be designated as a motor position sensor of the rotary motor 703, wherein the position detection can be carried out independently of a coil geometry and a phase shift between the coils. Furthermore, it is conceivable for the movable element 707 to be arranged together with the coil arrangement 709, 711 and the position detection apparatus 713 in the interior of the motor 703, provided that the movable element 707 is connected to the driveshaft 705 in a manner allowing rotary movement.

Figure 8:
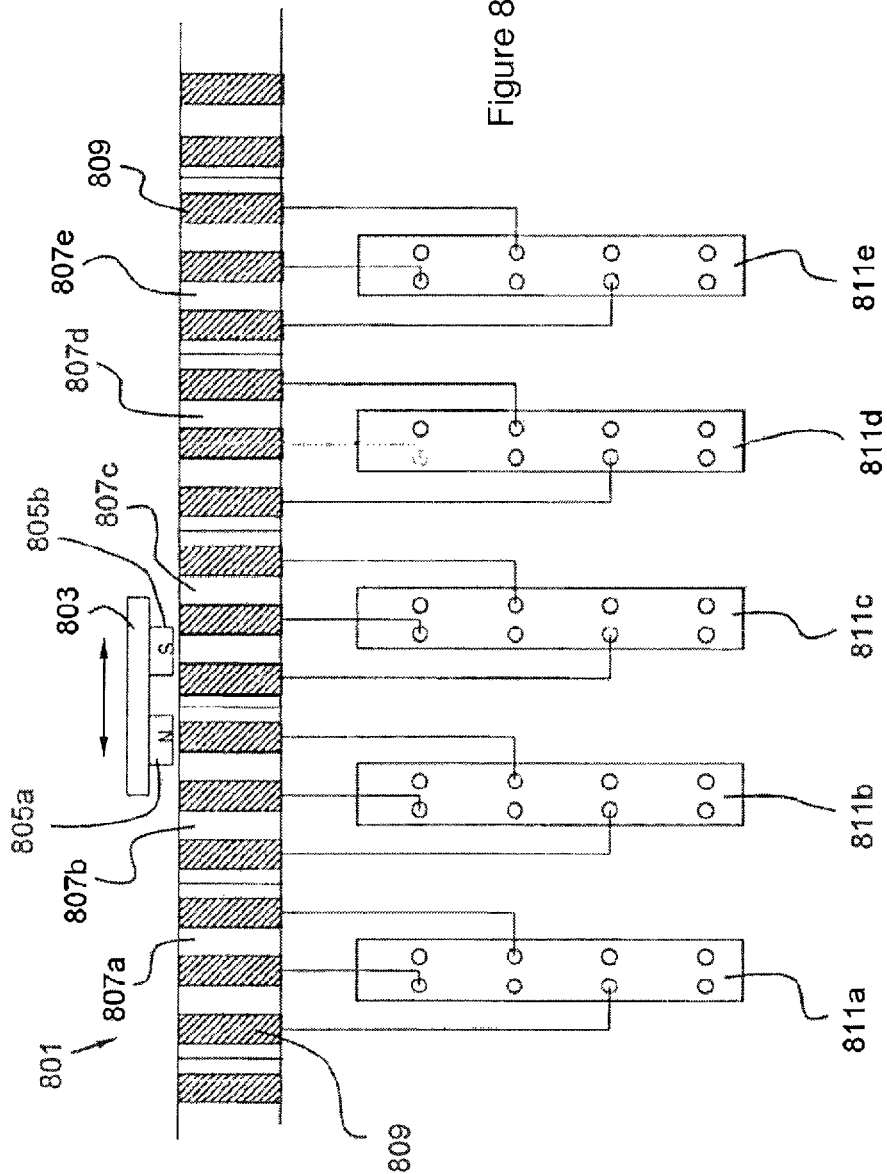
FIG. 8 shows a further drive apparatus.

FIG. 8 shows another drive apparatus 801. The drive apparatus 801 is embodied as a linear motor system. The drive apparatus 801 comprises a slide 803, wherein, preferably, a plurality of slides can also be formed. The slide 803 has two permanent magnets 805a and 805b, which can preferably be arranged on a plate composed of a magnetic material (not shown). The permanent magnets 805a and 805b are arranged alternately in north and south orientation. In an embodiment that is not shown, a plurality of permanent magnets can also be provided, which are then arranged alternately in north and south orientation on the slide 803 or on the plate.

Furthermore, a plurality of path elements 807a, 807b, 807c, 807d and 807e are formed along a travel path. Preferably, more than five or fewer than five path elements can also be formed. In particular, the path elements form a self-contained travel path. That is to say, in particular, that a start of the travel path also corresponds to the end thereof. Generally, a travel path, whether closed or not, can have any desired geometry, for example a straight line, a circle, an arc, or a curve, for example an S-curve.

Each path element 807a to 807e comprises three coils 809, which can also be designated as drive coils. Preferably, more or fewer than three drive coils per path element 807a to 807e can also be provided. A number of the drive coils can be different or identical per path element.

Furthermore, each path element 807a to 807e is assigned a corresponding electronic unit 811a, 811b, 811c, 811d and 811e for energizing the drive coils 809. Individual energization of the drive coils 809 is made possible by means of the electronic units 811a to 811e. A magnetic field is then generated by means of this individual energization of the individual drive coils 809, such that an advancing force is established via the cross product of the magnetic field generated with the magnetic field of the permanent magnets 805a and 805b on the side 803, such that a movement, in particular a linear movement, of the slide 803 can advantageously be regulated in terms of speed and position. In this case, the energization of the individual drive coils 809 is predefined by a superordinate control system (not shown) so as to result in a continuous movement of the slide 803. In this case, the coils can be assigned to other slides repeatedly from a temporal point of view. As a result it is advantageously possible to realize a contactless movement of as many slides as desired on a common travel path having a wide variety of geometries merging into one another, for example straight line, circle, arc, curve or S-curve, including continuously in a closed circulation. The circulation can also be open.

The drive apparatus 801 furthermore comprises a position detection system or a position detection apparatus which can detect the position of the movable slide 803. In particular, the position detection apparatus can detect a linear position of the slide 803. For the sake of clarity, the position detection apparatus is not shown in FIG. 8. The position detection apparatus comprises, in particular, a plurality of primary coils and a plurality of secondary coils assigned to the primary coils. These coils can be integrated in a module (cf. FIG. 9). If the slide 803 then travels along the travel path over the individual path elements 807a to 807e, the slide 803 will interfere with an electromagnetic field induced in the secondary coils, which can be detected by means of a measurement of the secondary coil voltage.

Figure 9:
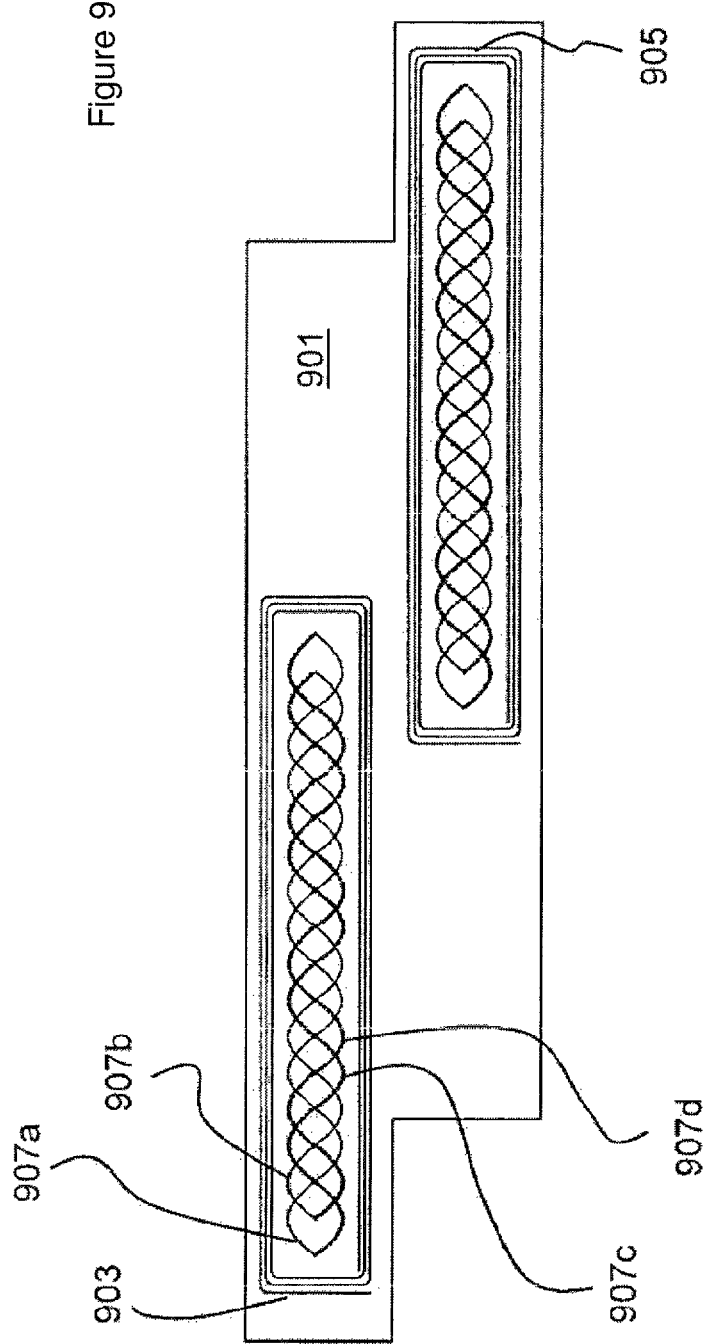
FIG. 9 shows a module comprising two excitation coils with assigned secondary coils.

FIG. 9 shows a module 901, which can generally also be designated as a coil module. The coil module 901 comprises two excitation coils 903 and 905, wherein the excitation coils 903 and 905 are in each case assigned a plurality of secondary coil pairs. The first secondary coil pair is formed from a first cosinusoidal secondary winding 907a and a first sinusoidal secondary winding 907b. The second secondary coil pair is formed from a second cosinusoidal secondary winding 907c and a second sinusoidal secondary winding 907d. For the sake of clarity, only the first secondary windings of the excitation coil 903 have been identified by corresponding reference signs. The secondary coils of the excitation coil 905 are also embodied analogously.

The excitation coils 903 and 905 are arranged alongside one another partly in an overlapping manner, thus advantageously enabling position determination over path distances of arbitrary length without any interruptions. Such coil modules 901 can, for example, simply be arranged alongside one another in order thus to detect path distances of arbitrary length.

Such coil modules like the coil module 901 can be integrated, in particular, in the path elements 807a to 807e shown in FIG. 8. Generally, such coil modules can also be directly integrated in a position detection apparatus. Thus, by way of example, existing drive apparatuses, in particular linear drive apparatuses, can subsequently be upgraded for position detection particularly simply and expediently.

Figure 10:
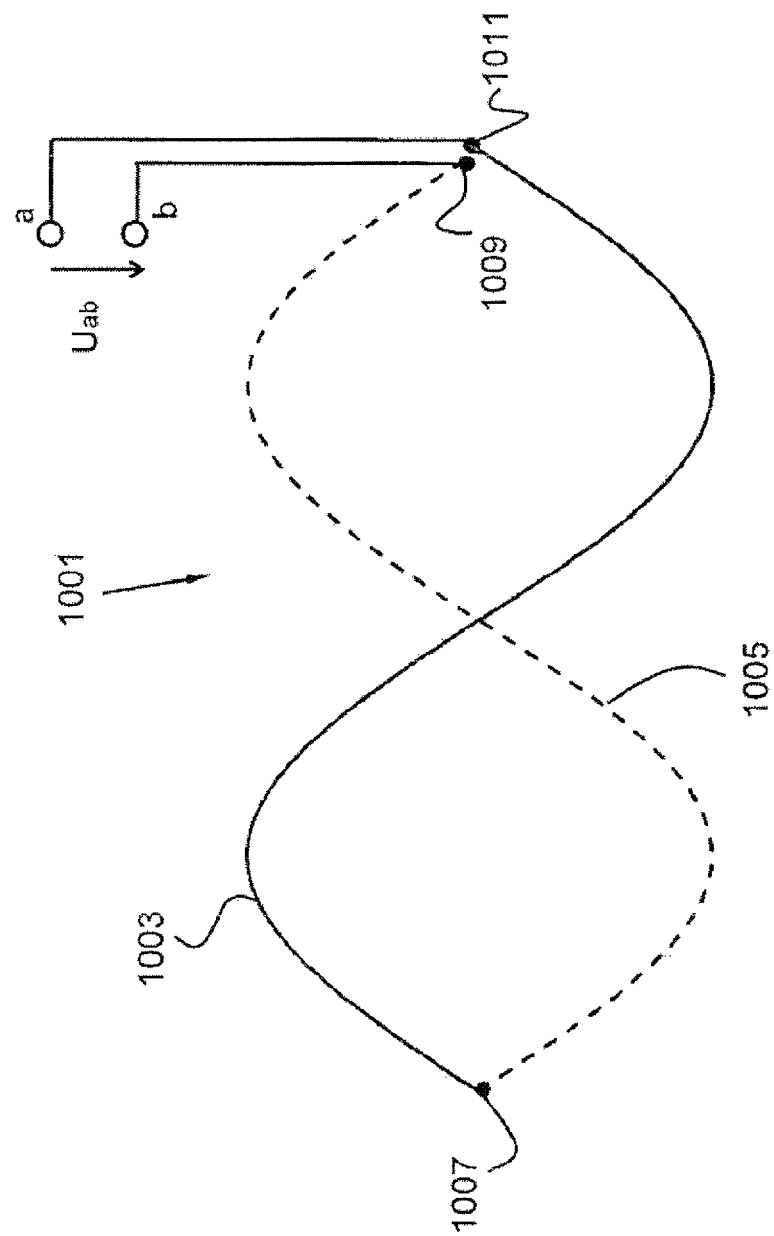
FIG. 10 shows a schematic construction of a secondary coil.

FIG. 10 shows a schematic illustration of an individual secondary winding 1001. The secondary winding 1001 is preferably formed as a conductor track on a circuit board (not shown). In this case, a "positive" sinusoidal conductor track 1003 and a "negative" sinusoidal conductor track 1005 are provided. The conductor track 1003 is preferably arranged in a first position, and the conductor track 1005 is preferably arranged in a second position. The first position can also be designated as position A. The second position can also be designated as position B. Both conductor tracks 1003 and 1005 make through-contact and are connected to one another at a point 1007. The connecting point 1007 can also be designated as a through-contact.

The conductor track 1003 has a first winding end 1010. The conductor track 1005 has a second winding end 1009. A differential voltage of the secondary winding 1001 is then measured at the two winding ends 1009 and 1011. The differential voltage can be designated as $U_{ab}$, wherein "a" stands for the first winding end 1011 and "b" stands for the second winding end 1009.

Preferably, the point "b", that is to say the second winding end 1009, is grounded. A voltage present at the point "a" is then preferably also measured relative to ground, such that a differential voltage $U_{ab}$ of the secondary winding 1001 or of the secondary coil is also measured in this case.

The measurement principle according to the invention for detecting the position of the slide 803 from FIG. 8 on the basis of the coil arrangement or coil module shown in FIG. 9 will be explained in greater detail below.

The outer excitation coil 903 having n windings comprises a plurality of inner secondary coils, partly formed from the secondary windings 907a to 907d. Preferably, all the coils, that is to say excitation coils and secondary coils, can be realized by conductor tracks on a circuit board. Preferably, the secondary coils have a sinusoidal or cosinusoidal geometry. In particular, these are both arranged in a manner offset by 90° with respect to one another. Preferably, however, other geometries such as, for example, a triangular geometry and/or phase shifts other than 90° are also possible. The excitation coil 903 is supplied with an AC voltage, in particular, and the output voltage of the secondary coils is measured. The difference between the output voltages, for example $U_{ab}$, is approximately zero if the fields of the coils are not interfered with by electrically conductive objects, for example the slide 803. If a slide 803 then travels over the coils, a differential voltage is measured in the secondary coil or between the secondary coils. In particular, provision can be made for the slide 803 to have an electrically conductive lamina having an effective width not equal to the period length of the secondary coil. The differential voltage therefore makes it possible to deduce the position of the slide 803 or of the metallic lamina. On account of the specific arrangement, the phase shift and the form of the secondary coils, it is possible to use a mathematical function for calculating the position. The frequency of the AC voltage that supplies the excitation coil 903 is preferably in the range of 100 kHz to 10 MHz. In this case, the measuring method according to the invention in particular advantageously also allows a plurality of pairs of secondary coils to be able to be accommodated in an excitation coil. In this case, two differential voltages are then preferably measured for each pair of secondary coils. This advantageously enables a position of the slide 803 or of the lamina to be measured continuously over a longer distance.

The measurement principle described in connection with the excitation coil 903 analogously also applies to the excitation coil 905 or to further excitation coils with assigned secondary coils arranged in a coil module.

The described measurement principle according to the invention can be applied not only to straight path distances, but also to arbitrary forms. For this purpose, in particular, a form of the excitation or primary coil and the secondary coils is then altered in such a way that a ratio between them remains the same. In this way, arbitrary geometries such as straight lines or a wide variety of curves can then advantageously be detected, for example.

Figure 11:
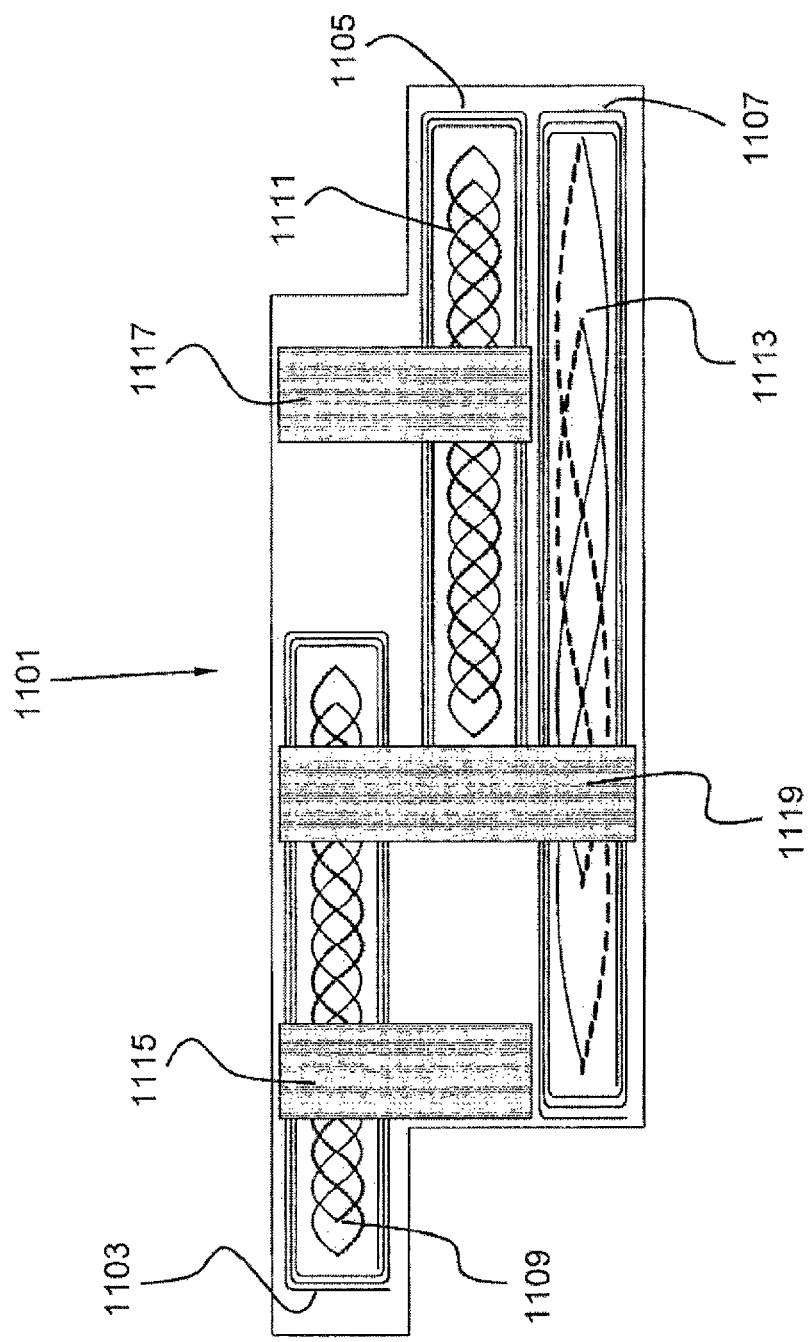
FIG. 11 shows a further module comprising three excitation coils with assigned secondary coils.

FIG. 11 shows a further coil module 1101 comprising three excitation coils 1103, 1105 and 1107. The three excitation coils 1103, 1105 and 1107 are arranged alongside one another at least partly in an overlapping manner. A plurality of pairs 1109, 1111 and 1113 of secondary coils are assigned to each excitation coil 1103, 1105 and 1107. Three electrically conductive laminae 1115, 1117 and 1119 are situated above the coil module 1101. The three laminae 1115, 1117 and 1119 are respectively arranged on a slide (not shown) which can be embodied in each case in accordance with the slide 803 from FIG. 8, for example. The electrically conductive laminae 1115 and 1117 of the two outer slides have an identical geometry, whereas the electrically conductive lamina 1119 of the central slide has a geometry deviating therefrom. In particular, the length of the lamina 1119 of the central slide differs from the length of the laminae 1115 and 1117 of the two outer slides. The length of the lamina 1119 suffices to be able to cover all three excitation coils 1103, 1105 and 1107. If only one outer slide, for example the slide to which the lamina 1115 is assigned, then travels over the coil module 1101, an interference signal is induced only in the secondary coils 1109, or if all three slides are moved further toward the right, an interference signal is additionally induced in the secondary coils 1111. Consequently, although it can be ascertained that a movable element is situated at the location, it is not yet possible to unambiguously identify the slide. However, if the central slide, to which the lamina 1119 is assigned, then travels over the coil module 1101, an interference signal is induced both in the secondary coils 1109 and 1111 (depending on the position of the slide) and in the secondary coils 1113. Since only this slide has an electrically conductive lamina 1119 that also covers the secondary coil 1113, it is now possible to ascertain unambiguously where exactly this slide is situated and it can thus be identified. If a plurality of slides are arranged in a closed circulating system, then it suffices to equip one slide with a lengthened lamina 1119. Since this slide is unambiguously identified, the order of the further slides is also always unambiguous, since, after all, their order cannot change. Furthermore, such an arrangement having different electrically conductive laminae also affords the advantage that therein no initial movement of the slides past arbitrary other sensors has to be effected in order to enable a unique identification of each individual slide.

In an exemplary embodiment that is not shown, the coil module can also comprise more than three excitation coils with assigned pairs of secondary coils. In particular, slides having more than three laminae or fewer than three laminae can also be provided. In the case of a slide having two laminae, one of the two laminae is preferably embodied or arranged on the slide such that this lamina covers only one excitation coil with its assigned secondary coils. Such slides can in particular then also be distinguished from one another by virtue of a distance between the two laminae being variable, such that this distance can be varied. Each of these slides then has its own defined distance between the laminae among one another and in this respect can advantageously be unambiguously identified.

In a further embodiment that is not shown, provision can be made for one of the laminae 1115, 1117 and 1119 to be wider or narrower than the other two laminae. Since the electromagnetic interference of the induced coil voltage is dependent in particular on the width of a lamina, it is thus advantageously possible to achieve a unique identifier of the slide with the lamina having a different width than the other laminae. In a further embodiment that is not shown, this unique identifier can also be effected by means of a lamina having a different width and having a different length, as described further above. Although only three laminae have been described here, this is not intended to signify a restriction. In particular, it is also possible to provide a plurality of laminae or fewer laminae. The described principle of the unique identifier can be applied to an arbitrary number of laminae.

Figure 12:
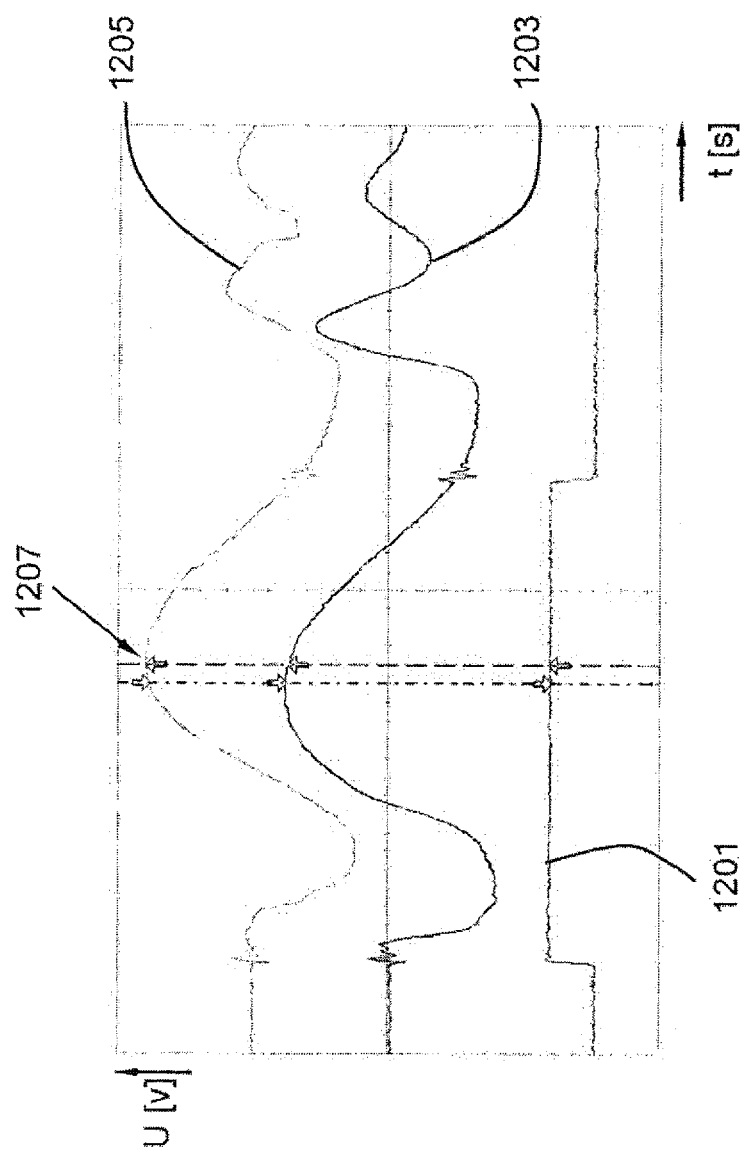
FIG. 12 shows a graph showing a temporal profile of an excitation pulse and an induced coil voltage.

FIG. 12 shows a graph showing a temporal profile of an excitation pulse signal and of a coil voltage signal of the secondary coil. The voltage U in volts is plotted against a time t in seconds. The reference sign 1201 designates the temporal profile of the excitation pulse. The reference sign 1203 identifies the induced voltage signal present directly at the secondary coil. The reference sign 1205 identifies the induced voltage signal of the secondary coil after preamplification. Such preamplification can generally be carried out by means of a preamplifier device, in particular.

The excitation pulse 1201 has a rectangular shape, this pulse in particular not being applied directly to the excitation coil, but rather preferably to a resonant circuit, in particular a harmonic resonant circuit. This resonant circuit harmonizes the rectangular pulse and forms, in particular, an excitation pulse having a harmonic oscillation, in particular a sinusoidal oscillation or cosinusoidal oscillation, the harmonized excitation pulse preferably having an amplitude that decreases over time. This excitation pulse is then applied to the excitation coil.

The point with the reference sign 1207 identifies the maximum of the coil voltage of the secondary coil. A measurement of the coil voltage signal 1203 or 1205 preferably takes place in a predetermined time window comprising the respective maximum. In order to detect this maximum 1207, this predetermined time window can be shifted on the time axis.

A direct sampling of the voltage 1203 at the secondary coil or of the voltage 1205 after a preamplification is preferably effected by means of an analog-to-digital converter in the range of, in particular, a few nanoseconds. The measured voltages are then evaluated in particular by means of a logic component, in particular a logic circuit, for example an FPGA or an ASIC.

Such a logic component or such a logic circuit can furthermore be used to generate an AC voltage for the excitation winding. In particular, a harmonic resonant circuit can be connected to the logic circuit. Preferably, a decaying oscillation is generated instead of a continuous AC voltage. The logic circuit can in particular furthermore control a start instant of the AC voltage or of the oscillation, that is to say of the excitation pulse.

In an embodiment that is not shown, the logic circuit also controls a voltage measurement at the secondary coils. In this case, the coil voltage is preferably measured when the maximum of the oscillation is reached. This instant or the temporal difference with respect to the start instant of applying the excitation pulse to the excitation coil is preferably regulated in such a way in order advantageously to ensure that measurement is always effected at the maximum of the oscillations. External influences such as temperature fluctuations, for example, can thus advantageously be compensated for.

The logic circuit can furthermore preferably be designed to generate a suitable AC voltage for the excitation coil. In particular, the logic circuit is programmed by software such that it can be synchronized with a time signal of a superordinate control system, and so the AC voltage or generally the excitation pulse can be generated synchronously with the external time signal of the control system or controller.

The start instant of generating the excitation pulse or the pulsed excitation signal can preferably be shifted in the time frame of nanoseconds. A corresponding regulation has the effect, in particular, that the start instant of generating the excitation pulse is implemented at a defined instant with respect to the external time signal of the superordinate controller or control system. By means of such a method, it is thus advantageously possible to achieve sampling frequencies of a few kilohertz, for example approximately 50 kHz.

To summarize, position detection across a plurality of coil modules is made possible by means of the exemplary embodiments mentioned above, since, in particular, the position detection is effected synchronously and at a fixed point in time in relation to a superordinate control system. The control system is generally designed in particular for controlling a linear movement of the individual slides.

If two coil modules are in operation simultaneously alongside one another, it can happen that the adjacent excitation coils mutually influence one another. By way of example, it can happen that an electromagnetic field of one excitation coil induces a current in the secondary coils assigned to the adjacent excitation coil while a position detection is being carried out. This can, but need not, generate recurring position errors.

In order to prevent such mutual interference and to enable even more precise position detection, the invention proposes that an excitation pulse, for example an AC voltage, is applied to such adjacent excitation coils in adjacent coil modules with a time offset. The start instants of the individual excitation pulses or of the AC voltages are temporally offset in particular with respect to the external time signal of the superordinate controller. Consequently, advantageously, two adjacent excitation coils can now no longer mutually influence one another because they are not in operation at the same time. A corresponding control logic can preferably be integrated into the programmable logic circuit. A time offset in the evaluation can be disregarded in particular at a high sampling frequency, but can also be worked out for example by means of an interpolation.

Figure 13:
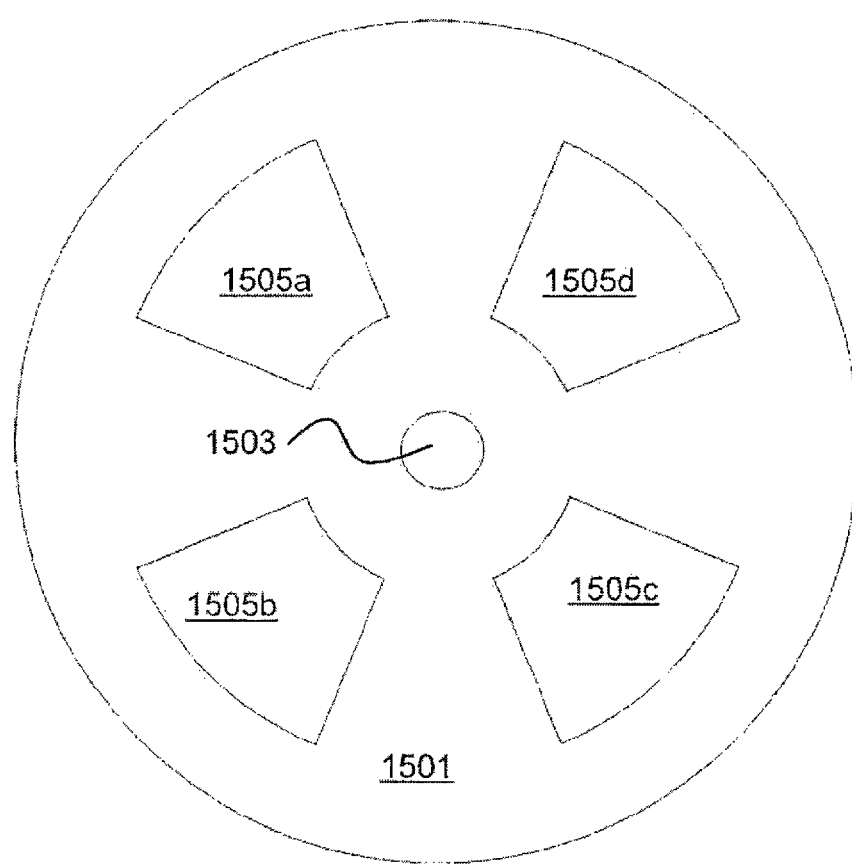
FIG. 13 shows a movable element in the form of a disk with stamped-out portions.

FIG. 13 shows a movable element 1501 in the form of an electrically conductive disk which could be used for example in a construction in accordance with FIG. 7. The electrically conductive disk 1501 has concentrically a cutout 1503 at the center of the circular shape. Furthermore, the circular disk 1501 has four quadrilateral cutouts 1505a, 1505b, 1505c and 1505d distributed symmetrically over 360°. These cutouts or recesses can preferably be stamped out. The central circular cutout 1503 is used, in particular, for plugging the disk 1501 to a motor shaft or driveshaft of a rotary motor (not shown), such that the rotary motor can rotate the disk 1501.

Figure 14:
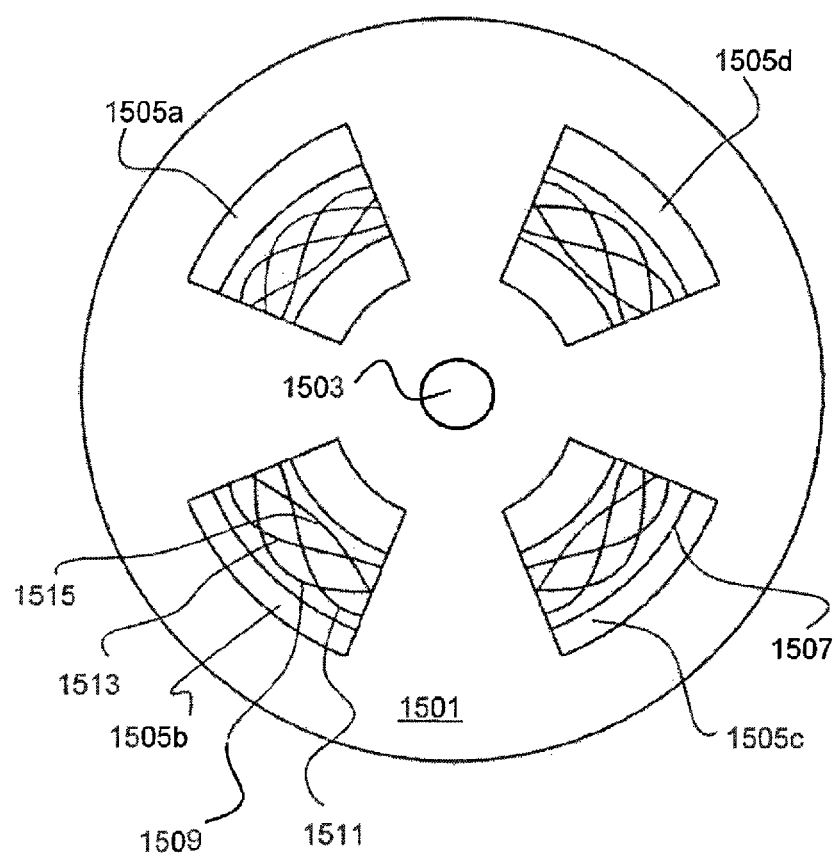
FIG. 14 shows the disk according to FIG. 13 in interaction with an excitation coil and a plurality of secondary coils assigned to the excitation coil.

FIG. 14 schematically shows the disk 1501 shown in FIG. 13 in a plan view when plugged on a driveshaft (not shown) of a rotary motor (not shown). An excitation coil 1507 is shown, to which a plurality of secondary coils 1509, 1511, 1513 and 1515 are assigned. The excitation coil 1507 and the secondary coils 1509, 1511, 1513 and 1515 are arranged in a stationary, that is to say fixed, manner in the rotary motor. The coils are preferably formed as conductor tracks on a circuit board. A rotation of the disk 1501 leads to an electromagnetic interference signal in the secondary coils 1509, 1511, 1513, 1515, which can be detected by means of corresponding differential measurement of the coil voltages. Since the disk 1501 is fixedly connected to the driveshaft, an angle of rotation of the driveshaft can thus advantageously be determined.

Preferably, a plurality of fine periods of a secondary winding, preferably four fine periods each of 90°, run in a cutout 1505a to 1505d. This advantageously enables an angle of rotation to be detected with an even higher resolution and precision.

Preferably, one of the cutouts 1505a to 1505d is formed differently than the other cutouts 1505a to 1505d. By way of example, a stamped-out area can be larger or smaller. By way of example, the stamped-out area can be dimensioned such that this one cutout covers a further excitation coil (not shown) with further associated secondary coils (not shown). Consequently, an unambiguous detection of the angle of the rotary motor is advantageously made possible within a single revolution.

To summarize, the invention enables particularly fast evaluation in drive apparatuses, in particular linear drive apparatuses, with sampling rates of, in particular, greater than 2 kHz, which can preferably be used in movement applications for commutation, current, rotational speed and/or position regulation.

The method according to the invention for detecting a position of a movable element of a drive apparatus can preferably be used in a motor position sensor in a rotary motor independently of the geometry of the coils and the phase shift between the coils. Furthermore, the invention enables a synchronous evaluation of the individual coil modules for position detection by, in particular, synchronization on a superordinate, that is to say for example external, clock generator (in particular on account of the use of a DLL circuit and on account of the use of pulsed excitation signals), and an interference-free evaluation of adjacent coil arrangements.

Furthermore, the invention makes it possible that individual movable slides or generally movable elements can be identified unambiguously, in particular by different and/or additional laminae, in particular electrically conductive laminae, being arranged onto the movable elements or onto the slide or slides.

Furthermore, the invention enables, in particular, wireless energy transmission to a moved system with simultaneous utilization of the electronics and the stationary part of the motor for generating the movement force and the energy transmission.

The invention therefore encompasses the concept of applying an electrical excitation pulse to an excitation coil. The applying can preferably comprise supplying the excitation coil with an AC voltage. As a result of the electrical excitation pulse being applied, an electrical voltage is induced in the secondary coil. If the movable element then moves over the secondary coil, this will change a maximum value of the temporal coil voltage profile in the secondary coil. This change, which is found in particular by means of a measurement of the induced coil voltage, is used for determining the position of the movable element. If no movable element is moving over the secondary coil, the electromagnetic coupling is not disturbed and the induced coil voltages cancel one another out, such that the measured secondary coil voltage tends toward zero. By virtue of the fact that only one electrical excitation pulse is applied to the excitation coil, the induced coil voltage will also have only a temporally limited duration. Consequently, the position of the movable element can advantageously be determined even after a very short time compared with the prior art after the excitation pulse has been applied to the excitation coil. Particularly in relation to the known methods that generally involve measuring an envelope of a voltage measurement signal over more periods of the signal, the method according to the invention enables a much shorter measurement duration—it is precisely not necessary to effect measurement over a plurality of periods —, as a result of which determining the position of the movable element has a considerably shorter duration compared with the known systems.

According to one embodiment, a differential voltage of the secondary coil is measured. A coil within the meaning of the invention has, in particular, a coil beginning and a coil end, wherein a differential voltage is measured in particular between the coil beginning and the coil end. Preferably, a coil, that is to say an excitation coil and/or a secondary coil, comprises n windings, wherein n stands for the number of windings.

In a further embodiment, the coil end or the coil beginning is grounded, wherein, in particular, a voltage between the coil beginning and coil end respectively is then measured, which corresponds to a differential voltage of the coil. The measured differential voltage then makes it possible, in particular, to deduce the position of the movable element. In this case, by way of example, a mathematical function is used for calculating the position on the basis of the measured differential voltage.

According to one embodiment, the secondary coil has a sinusoidal or cosinusoidal geometry. In particular, the secondary coil can also have a triangular geometry. Such a geometry means, in particular, that the maximum value of the induced voltage in the secondary coil mapped over the position of the movable element has a cosinusoidal or sinusoidal or triangular temporal profile. Such geometries can be realized in particular by means of corresponding winding arrangements. If a plurality of secondary coils are provided, they can have a sinusoidal or cosinusoidal geometry, for example, which are preferably arranged in a manner offset by 90° with respect to one another. That is to say that a phase difference between the respective induced sensor coil voltage is 90°. Preferably, however, such a phase shift can also be different than 90°.

An excitation pulse within the meaning of the invention has, in particular, a limited time duration. The time duration is preferably in the microseconds range. A time duration of the electrical excitation pulse can preferably also be less than 1000 μs or less than 100 μs, in particular less than 10 μs. The shorter the electrical excitation pulse, the shorter, too, a time duration of the induced coil voltage in the secondary coil. Furthermore, as a result, it is also possible, in particular, advantageously to avoid electromagnetic interference in an adjacent excitation coil or secondary coil. Position determination can be carried out particularly sensitively as a result.

In accordance with one embodiment, a plurality of electrical excitation pulses can be applied to the excitation coil. This advantageously makes it possible to carry out a plurality of position measurements successively. A travel path of the movable element can advantageously be tracked in this respect. Generally, an electrical excitation pulse can also be designated as an electrically pulsed excitation signal. A time interval between two electrical excitation pulses or two pulsed excitation signals can be 20 μs, for example. The electrical excitation pulses are preferably applied with a repetition frequency of 1 kHz to 1 MHz. A time duration of the excitation pulse can also be, in particular, between 600 ns and 2000 ns, wherein the excitation pulse preferably has a time duration of approximately 600 ns or approximately 2000 ns.

In accordance with one exemplary embodiment, it is also possible for a plurality of secondary coils, in particular two, for example four, preferably eight, secondary coils, to be assigned to an excitation coil.

According to a further embodiment, it is also possible for a plurality of excitation coils, in particular two, for example three, in particular four, excitation coils, to be provided. Particularly the provision of a plurality of secondary coils advantageously enables particularly precise determination of the position of the movable element, since the relative position of the movable element with respect to the secondary coils can be determined by means of corresponding mathematical evaluation of the measured differential voltages. If a plurality of secondary coils are provided, a differential voltage relative to a secondary coil can preferably be measured. In addition or instead, it is also possible, in particular, to measure a differential voltage between two secondary coils. That is to say, in particular, that a differential voltage of one secondary coil and a differential voltage of the other secondary coil are measured, these two measured differential voltages then being taken into account computationally with one another by means of a mathematical function. On the basis of these measured differential voltages, the position of the movable element of the drive apparatus can then advantageously be determined.

By way of example, a differential voltage or a difference between two measured differential voltages can be approximately 0 V. This is the case, in particular, if the electromagnetic fields of the secondary coils are not interfered with by the presence of the movable element, which is the case, in particular, if the movable element is not situated in the vicinity of the secondary coils, for example above the secondary coils. A differential voltage or a difference between two measured differential voltages is not 0 V, that is to say is not equal to 0 V, particularly when the movable element interferes with the electromagnetic fields in the secondary coils. Such interference occurs particularly when the movable element is situated in the vicinity of the secondary coils, for example above the secondary coils. In particular, on account of the specific coil arrangement, the phase shifts and the form of the secondary coils, a mathematical function can then be used for calculating the position.

According to one embodiment, the secondary coils can also be assigned in pairs to the excitation coil. In this case, a differential voltage is then measured for each secondary coil pair. This advantageously makes it possible to continuously measure the position of the movable element even over a relatively long travel distance thereof.

A position within the meaning of the invention can be in particular a position in a coordinate system, in particular in a Cartesian coordinate system. A position of the movable element can therefore be described by means of an x-, a y- and a z-coordinate. Preferably, a position of the movable element can also be described by means of spherical coordinates. Particularly if the movable element is a rotating movable element, a position can also comprise an angle of rotation. That is to say, in particular, that an angle of rotation of the rotating element is determined.

In accordance with one embodiment, an excitation coil and/or a secondary coil can be formed as one or a plurality of conductor tracks on a circuit board. That is to say, in particular, that conductor tracks are formed on a circuit board in such a way that they form a coil. A circuit board can also be formed as a printed circuit board. Such a printed circuit board is, in particular, a carrier for electronic components. By virtue of the fact that the coils are preferably realized by conductor tracks on the circuit board, a particularly compact construction is made possible. In particular, this enables electrical contact to be made with the coils in a particularly simple manner.

In accordance with one embodiment, the excitation coil has a rectangular form, the secondary coil preferably being arranged in the rectangular form. Generally, a winding of the excitation coil can also be designated as an excitation winding. Generally, a winding of the secondary coil can also be designated as a secondary winding.

In accordance with one embodiment, the measured secondary coil voltage is sampled and digitized for digital further processing. Consequently, in an advantageous manner, analog demodulation by way of the excitation signal is no longer necessary. In particular sampling frequencies of a few kHz, for example 50 kHz, can thus be achieved. In the known prior art, the measured analog voltage signal is used for a cross-correlation with the analog excitation voltage signal. Only the analog signal that results from the cross-correlation is then digitized. In contrast to this, however, in this embodiment, the measured secondary coil voltages are directly digitized and then processed further, which enables considerably faster position calculations.

According to a further embodiment, the excitation pulse has an amplitude that decreases over time. This advantageously makes it possible to avoid a situation in which, in a further excitation coil and/or the secondary coils which are assigned to said further excitation coil and which are arranged in particular in a manner adjacent to the excitation coil to which the electrical excitation pulse is applied, at a later point in time if measurement is intended to be effected in this further coil arrangement, an interference signal is induced. The excitation pulse preferably has a sinusoidal oscillation that decays over time or a cosinusoidal oscillation that decays over time. This advantageously has the effect that a maximum in the induced coil voltage signal becomes flatter. That is to say that around the maximum, which can be a local or a global maximum, a gradient is flatter than in other regions of the signal profile. As a result, the coil voltage signal still has a sufficient amplitude also to the right and left of the maximum, such that a signal-to-noise ratio is particularly favourable.

In another embodiment, the position detection apparatus has two excitation coils arranged adjacently, the excitation pulse being applied to each of said excitation coils with a temporal offset. That is to say, in particular, that firstly an excitation pulse is applied to one excitation coil. After a time offset or a temporal pause, the same or a different excitation pulse is then applied to the second excitation coil. In particular, more than two adjacent excitation coils can also be provided, wherein an excitation pulse can then be applied to them analogously in each case with a time offset. This advantageously avoids a situation in which an electromagnetic field of one excitation coil induces a current in the adjacent further excitation coil and in particular in the secondary coils assigned to the adjacent excitation coil, which might otherwise generate a recurring position error.

In another exemplary embodiment, the application of the excitation pulse is temporally synchronized with a time signal, in particular an external time signal. External here means, in particular, that the time signal is not generated in the apparatus for detecting a position of the movable element of the drive apparatus, but rather externally with respect to this apparatus, for example in the drive apparatus. In order to be able to generate a time signal, a timer, for example, is provided. Said timer can be integrated in the drive apparatus, for example, and in this case can be designated in particular as an external timer. However, provision can also be made for an internal timer to be provided, which is integrated in the apparatus for detecting the position of the movable element.

In accordance with a further embodiment, the internal timer can be temporally synchronized with the external timer. In particular, the internal timer generates an internal time signal, which can be synchronized in particular with the external time signal. The instant at which the excitation pulse is applied is preferably synchronized with the internal time signal, but can also be synchronized with the external time signal. In particular, the instant at which the excitation pulse is applied, wherein this instant can generally also be designated as a start instant, can have a temporal offset following the internal or external time signal. In this case, it is possible preferably to disregard a corresponding time offset during the determination of the position, in particular during the sampling and digitization of the measured secondary coil voltages, at sufficiently high sampling frequencies, but this time offset can also preferably be worked out by means of an interpolation.

In accordance with one exemplary embodiment, a measurement of the measured secondary coil voltages is carried out within a predetermined time interval. This predetermined time interval can also be designated as a time window. Within this time window, therefore, the measured coil voltages are in particular sampled and digitized. Further processing of the digitized data can subsequently be carried out. Preferably, the predetermined time interval is temporally shifted relative to the instant at which the excitation pulse is applied, such that an amplitude maximum of the induced coil voltage can be detected. In this case, the time window can preferably be shifted in a nanoseconds time frame. A regulating system is preferably provided, which controls the start instant of the generation of the excitation signal or the excitation pulse in such a way that it occurs at a defined instant with respect to the external time signal. Generally, the external time signal can also be generated in a control system, in particular a superordinate control system. Such a control system can for example be integrated in the drive apparatus and control a drive movement of the respective element.

In accordance with a further embodiment, the detector is connected to an analog-to-digital converter (A/D converter) for sampling and digitizing the measured secondary coil voltage. The detector preferably comprises the analog-to-digital converter. In particular, the coil voltage can be sampled in the range of a few nanoseconds. Therefore, this advantageously has the effect that the measured coil voltages can be directly sampled and digitized for digital further processing.

In another embodiment, an electrical resonant circuit for harmonizing the excitation pulse is formed between the pulse generator and the excitation coil. Preferably, the pulse generator comprises the electrical resonant circuit. Harmonization has the effect, in particular, that a rectangular excitation pulse, for example, becomes a sinusoidal oscillation or a cosinusoidal oscillation. In particular, the electrical resonant circuit can generate from an excitation pulse a pulse having a sinusoidal oscillation that decays over time or cosinusoidal oscillation that decays over time.

In a further embodiment, the pulse generator has a logic circuit for forming the excitation pulse. Such a logic circuit can preferably be formed as an integrated circuit. The logic circuit is preferably formed as a programmable logic circuit. Such a programmable logic circuit is also designated as a "field programmable gate array" (FPGA) or as a "programmable logic device" (PLD). By way of example, the logic circuit can be formed as a circuit that is designated as an "application specific integrated circuit (ASIC)". In particular, a synchronous counter or a clock generator or timer can be incorporated in the logic circuit, that is to say in particular in the FPGA or the ASIC. The logic circuit is preferably designed to evaluate the measured secondary coil voltages. Furthermore, the logic circuit can also be designed to generate the excitation pulse. Preferably, the logic circuit controls a start instant of the excitation pulse. Furthermore, the logic circuit controls in particular a coil voltage measurement on the secondary coil. Preferably, the coil voltage is measured at an instant when the maximum of the oscillation is reached. This instant or the temporal difference with respect to the signal of the excitation winding can also be regulated in a further method in order advantageously to ensure that measurement is effected at the maximum of the oscillation. External influences such as temperature fluctuations can thus advantageously be compensated for. The provision of a logic circuit has the advantage, in particular, that different functionalities, for example the generation of the excitation pulse, the measurement of the coil voltages, the synchronization of an internal time signal with an external time signal or the determination of the position of the movable element, can be integrated compactly in an electronic logic or logic circuit.

In a further embodiment, the detector has a further logic circuit for evaluating the measured secondary coil voltages. Provision can therefore be provided for the pulse generator and the detector to have two separate logic circuits, wherein the logic circuit in the detector can also be formed as an FPGA or as an ASIC. However, provision can also preferably be made for a single logic circuit, in particular an FPGA or an ASIC, to be provided, which is formed either in the detector or in the pulse generator or externally relative to both and can carry out the corresponding functionalities mentioned above.

In one exemplary embodiment, the pulse generator has an internal clock generator. This internal clock generator preferably generates an internal clock signal, which can be used for a regulating system for the instant of generating the excitation pulse. This internal clock generator is preferably synchronized with an external clock generator. That is to say, in particular, that an internal clock signal or time signal is temporally synchronized with an external clock signal or time signal.

A so-called delay-locked loop (DLL) circuit is preferably formed. Such a DLL circuit is, in particular, an electronic circuit having an input and an output, wherein a signal present at the input, in particular a clock signal or a time signal, is output via the output in a time-delayed manner. A clock generator and/or the logic circuit can comprise such a DLL circuit, with the result that it is possible to bring about by this means in particular in an advantageous manner defined time delays in the signal sequences and/or measurements.

In one embodiment, the movable element has at least one electrically conductive component for electromagnetically interfering with the electromagnetic field induced in the secondary coil. This interference is visible in particular in the measured secondary coil voltage, such that it is possible to establish the presence of the movable element in the region of the secondary coil. If such an interference signal is not present, it can be concluded that no movable element is situated in the region of the secondary coil. The electrically conductive component can preferably be formed as a body, in particular a rectangular body. Electrically conductive means, in particular, that the component is at least partly formed from an electrically conductive material. Preferably, the component can also be formed completely from an electrically conductive material. The electrically conductive component is preferably formed as a lamina. A lamina within the meaning of the invention is a rectangular body, in particular. Preferably, a plurality of electrically conductive components can also be provided, which can be embodied in particular differently or identically. An interference signal is dependent, in particular, on the design of an electrically conductive component and/or on a number of the electrically conductive components, such that differences in this regard also lead to different interference signals, which in turn leads to different induced coil voltages. Therefore, a concrete electrically conductive component can be assigned to a corresponding measured coil signal, as a result of which an identification of the movable element is advantageously made possible.

In a further exemplary embodiment, the drive apparatus has a linear motor, which can displace the movable element. In such a case, in particular a linear position of the movable element is determined. Preferably, the movable element is formed as a slide that can be displaced by means of the linear motor. In particular, one or a plurality of electrically conductive components are arranged on the slide.

Preferably, a plurality of slides that can be displaced by means of the linear motor are provided. In particular, a plurality of linear motors can also be provided. The slides can have in particular in each case an electrically conductive component. The electrically conductive components in this case can be formed identically or differently. Provision can preferably also be made for one or a plurality of slides also to have in each case a plurality of electrically conductive components. By way of example, a slide can have two electrically conductive components. On account of the different interference signals brought about by the different electrically conductive components in the secondary coil, an identification of the individual slides is advantageously made possible. In this respect, the slides have a dedicated identifier. They can therefore be unambiguously distinguished from one another. This unambiguous identifier furthermore makes it possible, in particular, that wear phenomena on the individual slides can be monitored in a targeted manner.

In another embodiment, in the position detection apparatus two excitation coils are provided which are arranged alongside one another at least partly in an overlapping manner Larger path distances can thus advantageously be detected. In particular, on account of such a mutual arrangement of excitation coils, it is possible to detect path distances of arbitrary length. Preferably, two such excitation coils arranged alongside one another in an overlapping manner and adjacently can be integrated in a module. Such modules can then be arranged alongside one another very easily in order thus to detect path distances of arbitrary length. Such a path distance need not necessarily extend rectilinearly, but rather can have arbitrary forms. Accordingly, a form of the excitation or primary coil and of the secondary coils is then changed accordingly, such that a ratio between them remains the same. In this way, it is then possible, in particular, advantageously to detect arbitrary geometries such as straight lines or a wide variety of curves having different curve radii. It is also possible for more than two excitation coils with assigned secondary coils to be arranged in a module, which can also be designated as a coil module. By way of example, three, four or more excitation coils with assigned secondary coils can be provided in a module. Preferably, the excitation coils are arranged alongside one another at least partly in an overlapping manner.

A linear motor within the meaning of the present invention comprises, in particular, a plurality of path elements. Each path element has a specific number of coils. These coils can preferably all be driven separately from one another, for example by means of a control apparatus. In particular one or a plurality of magnetic plates on which a plurality of magnets are arranged alternately in north and south orientation is/are arranged on the movable elements, in particular on the slides.

A magnetic field is generated by means of individual energization of the individual coils of the path elements, such that an advancing force is established via the cross product of the generated field with the field of the moved permanent magnets on the movable elements and the slide or the movable element becomes regulatable in terms of speed and position.

In this case, the energization of the individual coils is preferably predefined by the control system or the superordinate control system, thus advantageously resulting in a continuous movement of the movable elements, in particular the slides. In this case, the coils can be assigned, from a temporal point of view, repeatedly to other movable elements, in particular other slides.

It is thus possible to realize a contactless movement of as many movable elements, in particular slides, as desired on a common travel path with a wide variety of geometries merging into one another, for example a straight line, a circle, an arc or an S-curve, also continuously in a closed circulation. Such a closed circulation can also be designated as a closed system. The movable elements, in particular the slides, generally do not have, in particular, a cable-based connection to a fixed path. In this respect, the movable elements, in particular the slides, are arranged or formed on a travel path in a manner free of cables. A movable element in such a linear motor system can also be designated as a passive movable element, in particular as a passive slide.

In one exemplary embodiment, the position detection apparatus can also have three excitation coils preferably arranged in a module, wherein in particular in each case one or a plurality of secondary coils are assigned to these three excitation coils. These three excitation coils are arranged alongside one another at least partly in an overlapping manner. In particular, provision can then be made for the movable element to have an electrically conductive component having a length such that all three coils can be covered by means of the component. In particular, provision can also be made for the electrically conductive component to have a length such that the component covers only one or two excitation coils. Preferably, it is also possible to provide a plurality of electrically conductive components which can have correspondingly different lengths. In particular, the position detection apparatus comprises a plurality of modules.

An electrically conductive component which covers all three excitation coils will also induce a corresponding interference signal in all three excitation coils. An electrically conductive component which covers only one or two excitation coils can in this respect also only induce an interference signal in one or in both excitation coils. An identification of a movable element comprising such electrically conductive components can thus be achieved. Of course, this principle is also applicable to more than three excitation coils.

Preferably, it is also possible to provide four or more excitation coils which in particular can be integrated in a module. Preferably, it is also possible to vary a distance between two or more electrically conductive components, such that a corresponding assignment to a movable element is also made possible by way of a distance. Generally, the electrically conductive components can have an identical or a different geometrical form. Preferably, the components can differ in terms of their length and/or their width and/or their height and/or by virtue of their material. In particular, provision can be made for all the electrically conductive components to be formed identically apart from one electrically conductive component, which differs from the other components by virtue of its geometry and/or its material. A movable element having such a different component can advantageously be identified uniquely in this respect. Particularly in a closed system having a plurality of movable elements, a unique identifier of one movable element is thus made possible with the different component, since an order of the elements cannot change in the closed system.

In an alternative exemplary embodiment, the drive apparatus comprises a rotary motor. Such a rotary motor can be formed as an electric motor, for example. The movable element is preferably formed as a disk that is rotatable by means of the rotary motor. Preferably, the movable element is arranged on a motor shaft of the rotary motor. By way of example, the excitation coil and the secondary coil are arranged in a stationary manner in the rotary motor, such that the movable element, in particular the rotatable disk, can move or rotate above the coils. By way of example, the coils can be arranged or formed on a circuit board arranged in a stationary manner, i.e. in a non-moving manner in the event of a rotation of the motor. In particular an angle of rotation of the movable element, in particular of the rotatable disk, is detected in the case of the rotary motor.

According to one embodiment, an electrical energy is transmitted to the movable element by the drive apparatus. For this purpose, in the case of the linear motor, for example, in the coils of the linear motor already present along the movement region or movement path, which generate the rotating field for the linear movement of the slides, it is additionally possible to impress a high-frequency current, for example in the range of a few hundred Hz. The resultant field can then influence a voltage for example in a receiver coil, arranged in particular on the movable element, for example the slide, without the linear movement of the slide being influenced in this case.

Preferably, however, for such energy transmission it is also possible to use coils of the linear motor which are not energized for linear movement force formation at the point in time of the energy transmission. Such energy transmission along the travel path in a manner free of cables enables, in particular, transmission of powers of a few watts per coil. This advantageously enables wireless transmission of energy to the moved system, that is to say the slide, for example, with simultaneous utilization of the electronics and the stationary part of the motor, that is to say the linear motor, for example, in particular the coils, for generating the movement force and the energy transmission.

While the foregoing is directed to and describes embodiments of the present invention, including preferred embodiments, other and further embodiments and preferred embodiments of the invention may be devised without departing from the basic scope of the invention, the scope of the invention being determined by the claims that follow.

The invention claimed is:

1. A method for detecting a position of a movable element of a drive apparatus by means of a position detection apparatus comprising at least one excitation coil and a plurality of secondary coils assigned to the excitation coil,
the excitation coil comprising at least a winding,
the plurality of secondary coils being arranged within the winding of the excitation coil,
the plurality of secondary coils comprising a first secondary coil pair and a second secondary coil pair,
the first secondary coil pair being formed from a first cosinusoidal secondary winding and a first sinusoidal secondary winding,
the second secondary coil pair being formed from a second cosinusoidal secondary winding and a second sinusoidal secondary winding,
the method comprising the steps of:
applying an electrical excitation pulse to the excitation coil in order to induce electrical voltages in the secondary coils,
measuring the electrical voltages of the secondary coils, and
determining the position of the movable element on the basis of the measured electrical voltages.

2. The method as claimed in claim 1, wherein the measured electrical voltages are sampled and digitized for digital further processing.

3. The method as claimed in claim 1, wherein the excitation pulse has an amplitude that decreases over time.

4. The method as claimed in claim 3, wherein the excitation pulse has a sinusoidal oscillation that decays over time.

5. The method as claimed in claim 1, wherein the position detection apparatus has two excitation coils arranged adjacently, the excitation pulse being applied to each of said excitation coils with a temporal offset.

6. A position detection apparatus for detecting a position of a movable element of a drive apparatus, comprising:
at least one excitation coil and a plurality of secondary coils assigned to the excitation coil,
the excitation coil comprising at least a winding,
the plurality of secondary coils being arranged within the winding of the excitation coil,
the plurality of secondary coils comprising a first secondary coil pair and a second secondary coil pair,
the first secondary coil pair being formed from a first cosinusoidal secondary winding and a first sinusoidal secondary winding,
the second secondary coil pair being formed from a second cosinusoidal secondary winding and a second sinusoidal secondary winding,
and further comprising a pulse generator for applying an electrical excitation pulse to the excitation coil in order to induce electrical voltages in the secondary coils and a detector for measuring the electrical voltages of the secondary coils.

7. The position detection apparatus as claimed in claim 6, wherein the detector is connected to an analog-to-digital converter for sampling and digitizing the measured electrical voltages of the secondary coils.

8. The position detection apparatus as claimed in claim 6, wherein the pulse generator has an electrical resonant circuit for harmonizing the excitation pulse.

9. The position detection apparatus as claimed claim 6, wherein the pulse generator has a logic circuit for forming the excitation pulse.

10. The position detection apparatus as claimed in claim 6, wherein the pulse generator has an internal clock generator.

11. The position detection apparatus as claimed in claim 6, wherein at least two excitation coils are provided, which are arranged alongside one another at least partly in an overlapping manner and which are integrated in a module, wherein a plurality of secondary coils is assigned to each of the excitation coils, the excitation pulse being applied to each of said excitation coils with a temporal offset.

12. The position detection apparatus as claimed in claim 6, wherein the winding of the excitation coil has a rectangular form.

13. A drive apparatus comprising a movable element and a position detection apparatus for detecting a position of the movable element, the position detection apparatus comprising:
at least one excitation coil and a plurality of secondary coils assigned to the excitation coil, the excitation coil comprising at least a winding, the plurality of secondary coils being arranged within the winding of the excitation coil, the plurality of secondary coils comprising a first secondary coil pair and a second secondary coil pair, the first secondary coil pair being formed from a first cosinusoidal secondary winding and a first sinusoidal secondary winding, the second secondary coil pair being formed from a second cosinusoidal secondary winding and a second sinusoidal secondary winding, and further comprising a pulse generator for applying an electrical excitation pulse to the excitation coil in order to induce an electrical voltages in the secondary coils and a detector for measuring the electrical voltages of the secondary coils.

14. The drive apparatus as claimed in claim 13, wherein the movable element has at least one electrically conductive component for electromagnetically interfering with the electromagnetic field induced in the plurality of secondary coils.

15. The drive apparatus as claimed in claim 13, wherein at least two excitation coils are provided which are arranged alongside one another at least partly in an overlapping manner.

16. The drive apparatus as claimed in claim 13, further comprising a linear motor for displacing the movable element.

17. The drive apparatus as claimed in claim 13, further comprising a rotary motor for rotating the movable element.

18. A method for detecting a position of a movable element of a drive apparatus along a travel path by means of a position detection apparatus comprising:

at least two excitation coils, which are arranged in an offset manner in the direction of the travel path, comprising n windings, wherein n stands for the number of windings, and a plurality of secondary coils assigned to each of the excitation coils, the plurality of secondary coils being arranged within the n windings of the excitation coil, the plurality of secondary coils comprising a first secondary coil pair and a second secondary coil pair, the first secondary coil pair being formed from a first cosinusoidal secondary winding and a first sinusoidal secondary winding, the second secondary coil pair being formed from a second cosinusoidal secondary winding and a second sinusoidal secondary winding, the method comprising the steps of applying an electrical excitation pulse to each of the excitation coils with a temporal offset in order to induce electrical voltages in the secondary coils, measuring the electrical voltages of the secondary coils, and determining the position of the movable element on the basis of the measured electrical voltages.

19. The method as claimed in claim 18, wherein the excitation pulse has a sinusoidal oscillation that decays over time.

20. The method as claimed in claim 18, wherein the measured electrical voltages of the secondary coils are directly sampled and directly digitized for digital further processing.

* * * * *